United States Patent [19]
Moatti

[11] 4,138,773
[45] Feb. 13, 1979

[54] WOODWORK DRILLING AND SCREWING MACHINE

[76] Inventor: Henri Moatti, 107, Avenue de Saint-Mande, 75012 Paris, France

[21] Appl. No.: 860,727

[22] Filed: Dec. 15, 1977

[30] Foreign Application Priority Data

Dec. 22, 1976 [FR] France ................................ 76 38703
May 17, 1977 [FR] France ................................ 77 15095

[51] Int. Cl.[2] ......................... B23B 39/00; B27C 9/00; B27C 3/00

[52] U.S. Cl. .................................... 29/26 R; 144/3 R; 408/20

[58] Field of Search .................... 408/20; 144/3 R, 32, 144/103; 29/26 R, 26 A

[56] References Cited

U.S. PATENT DOCUMENTS

| | | | |
|---|---|---|---|
| 367,782 | 8/1887 | Brown | 408/20 |
| 3,381,725 | 5/1968 | Locher | 144/3 R |

FOREIGN PATENT DOCUMENTS

| | | | |
|---|---|---|---|
| 1453190 | 5/1969 | Fed. Rep. of Germany | 29/26 R |
| 2188474 | 1/1974 | France | 29/26 R |
| 995838 | 10/1973 | Italy | 29/26 R |
| 471649 | 6/1969 | Switzerland | 29/26 R |

*Primary Examiner*—Harrison L. Hinson
*Attorney, Agent, or Firm*—Stevens, Davis, Miller & Mosher

[57] ABSTRACT

Drilling and screwing machine intended more particularly for fitting door-hinge plates or like hardwares on pieces of joinery or similar elements, this machine comprising in the known fashion: a pivoting assembly consisting of a table supporting on one side a drilling head and on the other side a screwing head, an electric motor for rotatably driving said heads, a cylinder and piston unit of which the piston-rod supports said table, and means for retaining in position the piece of joinery which are secured to the front face of the machine base structure, said means consisting of a system comprising two tables adjustable, one about an horizontal axis and the other vertically, said machine being characterized in that it comprises on the other hand a box-shaped base structure (1) in which the main cylinder and piston unit (5) is enclosed with its piston-rod (2) extending vertically through an aperture (50) formed in the top (53) of said box-shaped base structure, means being also provided for moving and guiding the cylinder, piston-rod and table assembly through said aperture and locking said assembly in a preselected position, the tables associated with said base structure being so disposed that the first table (6) rotatably mounted on said base structure supports the second table (7) adapted to slide in relation thereto, said second table carrying the cylinder and piston units (8) provided for clamping the piece of joinery in position and holding it at the desired height and in the desired orientation.

10 Claims, 19 Drawing Figures

FIG.5
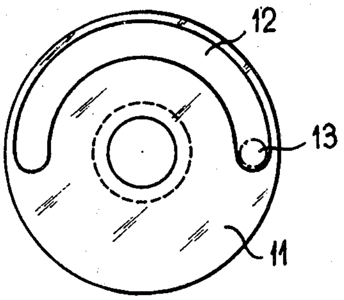
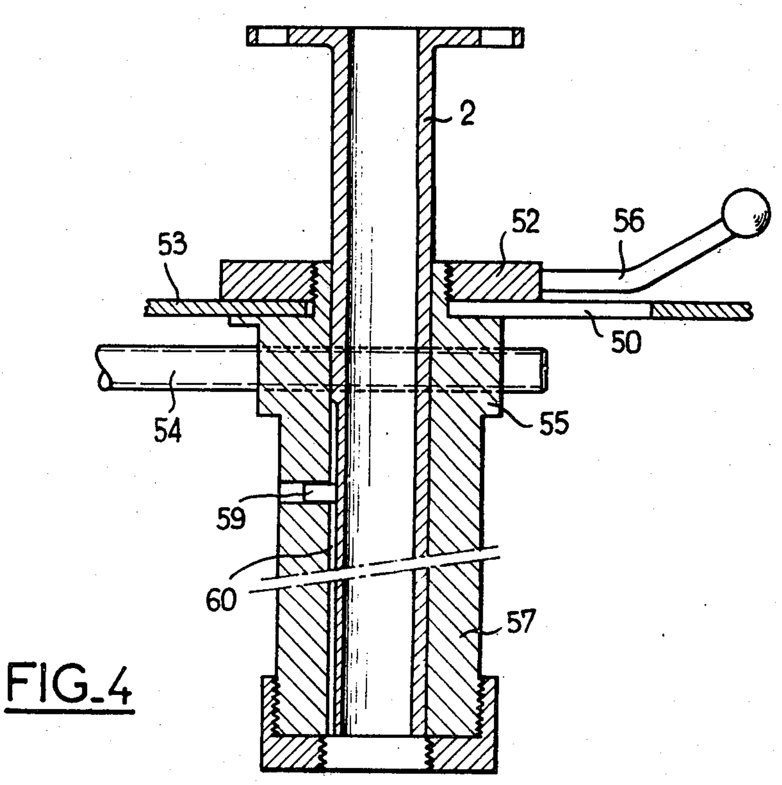
FIG.4

FIG. 19
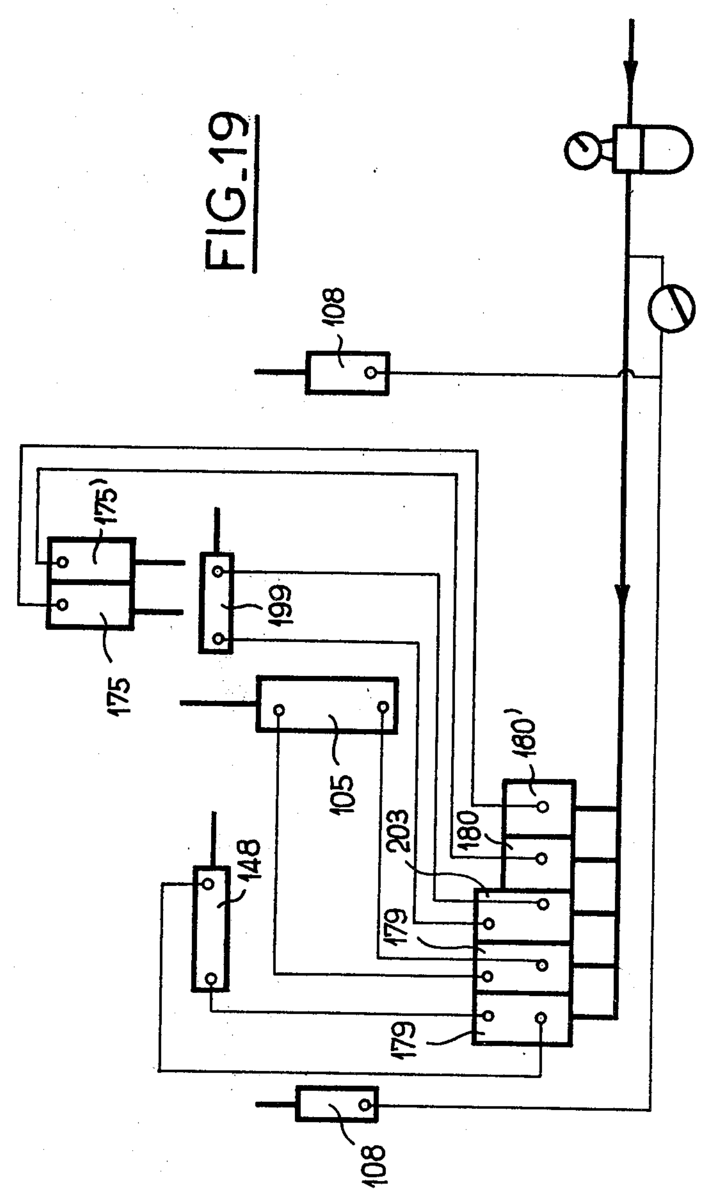
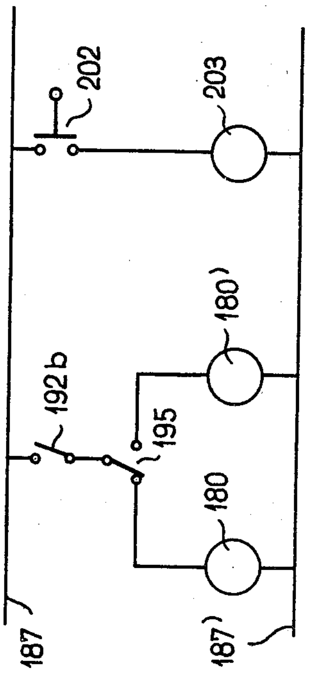
FIG. 18

WOODWORK DRILLING AND SCREWING MACHINE

Machines designed for positioning pegs, hinges, door-hinge plates and the like on joinery articles such as doors, windows, furnitures and the like are already known; machines of this type, on account of their size and production capacity, are intended more particularly for mass production plants.

Other manually operated machines of the so-called handicraft type are known which can easily be transported and operated.

This invention is concerned more particularly with machines of this last-mentioned type, and is directed to facilitate their operation and thus improve their efficiency.

Machines of this general type are already known which comprises, pivotally mounted on the rod or column of a fluid-actuated cylinder-and-piston unit, a pair of rotary spindles adapted the one to drive the drilling tool and the other to position a peg and screw same, the rotation of said spindles being derived from a common electric motor.

As a rule, these machines comprise jaws mounted directly on the cylinder of said unit and adapted to position themselves at the proper location on the upright of a joinery structure to be fitted with the desired hardware.

This construction however is objectionable in that the machine must be shifted in the fashion of a hand tool for each drilling operation.

It is the essential purpose of the present invention provide a machine of this character which is capable of operating at a fixed location and can receive the piece of joinery to be fitted with the desired hardware, so that said piece of joinery can easily be shifted for receiving pegs at various aligned locations and with the desired orientation.

For this purpose, and according to the present invention, an operating assembly comprising a cylinder and piston unit, a plate equipped with a pair of spindles provided the one with a drilling head and the other with a screwing head, an electric motor and suitable drive means, is mounted for vertical movement on a box-sectioned base structure supporting on its front face a pivoting table supporting in turn a sliding table on which means for clamping the piece of joinery to be worked are mounted, said base structure further comprising means for causing the translation of the cylinder-and-piston unit and also of the guide and marking means for positioning said piece of joinery along a section member advantageously comprising adjustable abutment means.

According to another feature characterizing this invention, the spindles are positioned above the piece of joinery or the like by means of a pin solid with said tray and adapted to move within an aperture formed in the rod of said cylinder and piston unit.

According to a more improved form of embodiment, it appeared that an advantageous solution consisted in incorporating in the machine means capable of performing automatically the cycle of operations necessary for positioning a hinge plate or other hardware to be fastened in position, i.e. starting the drilling head, stopping this head at the desired depth, lifting the head for freeing same, rotating the supporting table for bringing the screwing head to the position previously occupied by the drilling head, lowering the screwing head in order to cause same to accomplish its working stroke, stopping said screwing head at the desired orientation position, moving the head away from the screwed hardware, then lifting said screwing head and, finally, rotating said table for bringing the drilling head back to its operative position, so that the machine be ready to resume another working cycle, all these operations being controlled by means of suitable cylinder and piston units or motors.

For this purpose, in addition to the table lifting cylinder, a complementary cylinder is provided for pivoting this table together with members for controlling said cylinders according to a predetermined sequence.

The invention will now be described with reference to the attached drawings illustrating diagrammatically by way of example a typical form of embodiment of the drilling and screwing machine constituting the subject-matter thereof. In the drawings:

FIG. 4 is another detail view showing in axial section the support of the tray of the machine;

FIG. 5 is a plane view from above of the collar surrounding the piston-rod of the cylinder-and-piston unit;

FIG. 18 is a diagrammatic view of the control system of the feed means; and

FIG. 19 is a modified embodiment of the diagram of FIG. 14.

Figure 1:
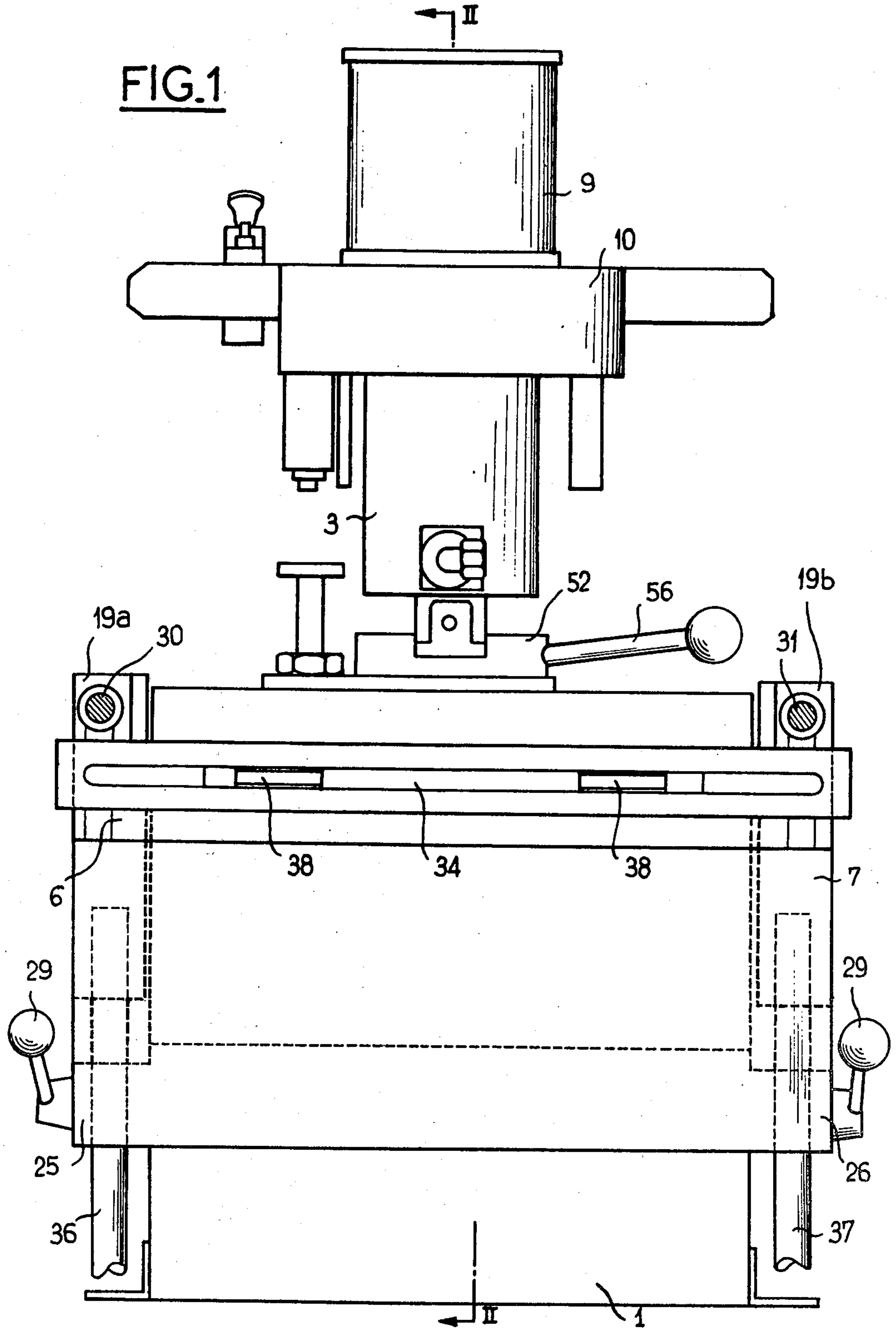
FIG. 1 is a front elevational view of the machine.
Figure 2:
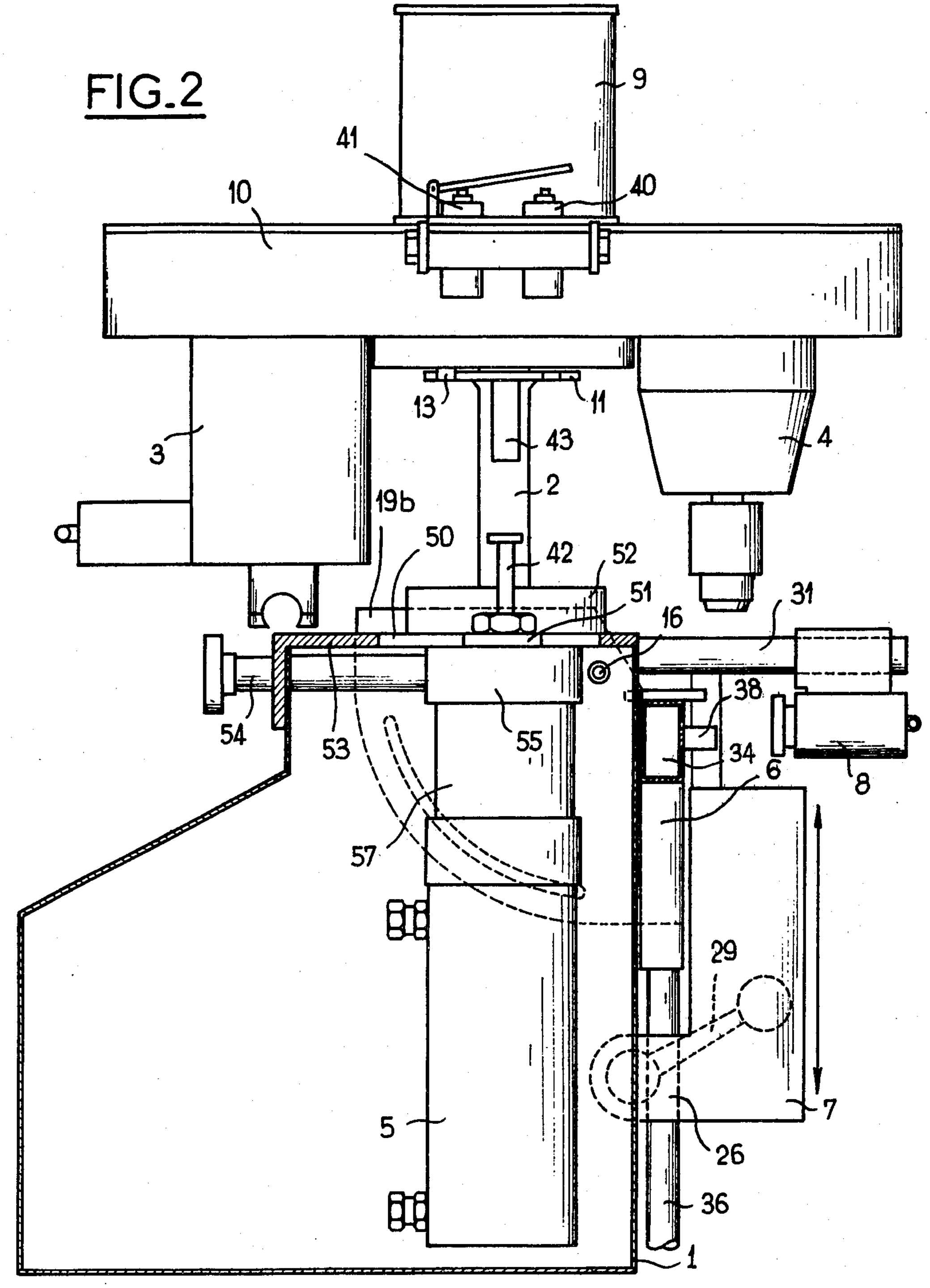
FIG. 2 is a cross section taken along the line II—II of FIG. 1.
Figure 6:
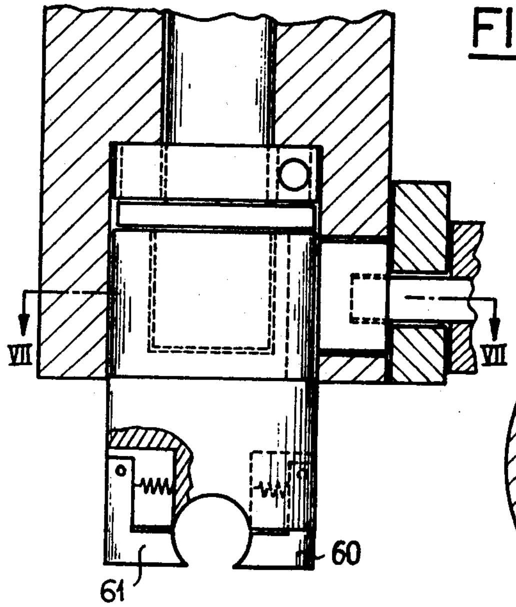
FIG. 6 is a part-sectional view showing the screwing spindle.
Figure 7:
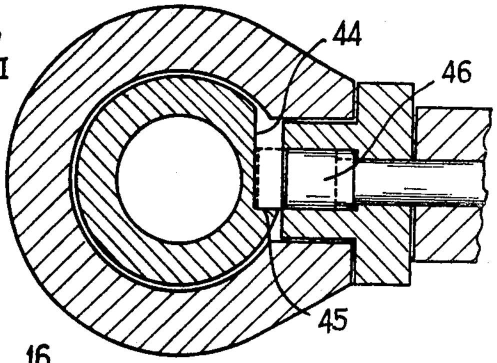
FIG. 7 is a section taken along the line VII—VII of FIG. 6.

The machine comprises essentially a base structure 1, a pneumatic or hydraulic cylinder-and-piston unit 5 supporting through its column or piston-rod 2 a plate, table or tray 10 supporting in turn the drilling and screwing heads 3 and 4, respectively, and a clamping unit comprising a pivoting table 6, a vertically sliding table 7 and a set of clamping jacks 8.

The cylinder-and-piston actuator or unit 5 is disposed vertically in the box-sectioned base structure and adapted to be secured to a table or bearing member through any suitable means, its piston-rod 2 projecting vertically and supporting at its upper end the electric motor 9 together with the plate 10 provided with drilling and screwing heads 3 and 4, respectively, and containing in the known manner the counter pinions and chains for rotatably driving the heads 3 and 4. A collar 11 rigid with said rod 2 comprises an elongated aperture 12 engaged by a pin 13 rigid with said plate 10 for limiting the movement of, and accurately positioning, the workpiece (see FIG. 5).

The assembly comprising the cylinder-and-piston unit 5, the piston-rod 2 and the plate 10 is movable through an aperture 50 extending in the front to rear direction in said upper plate 53 to permit the proper setting of this assembly in relation to a piece of joinery or the like woodwork clamped on said table 7 by means of said jacks 8.

For this purpose, the cylinder-and-piston actuator 5 is supported by a sleeve 57 carrying at its bottom, by screwing or any other suitable means, said actuator 5; said sleeve 57 comprises on the one hand a rectangular projection 51 for guiding same in said elongated aperture 50 and on the other hand a collar 52 slidably engaging the top surface 53 of the base structure 1. A worm 54 supported by the base structure extends through a base member 55 rigid with said sleeve 57 and controls the movement of the assembly comprising the actuator, the piston-rod, the plate and the motor. A clamping handle 56 is mounted on said collar 52 for locking the assembly in the desired position or location.

The piston rod 2 extends through the sleeve 57 in which it can slide freely without rotating due to the provision of means such as a tenon 59 rigid with the sleeve and engaging an elongated slot 60 formed in said rod.

Figure 3:
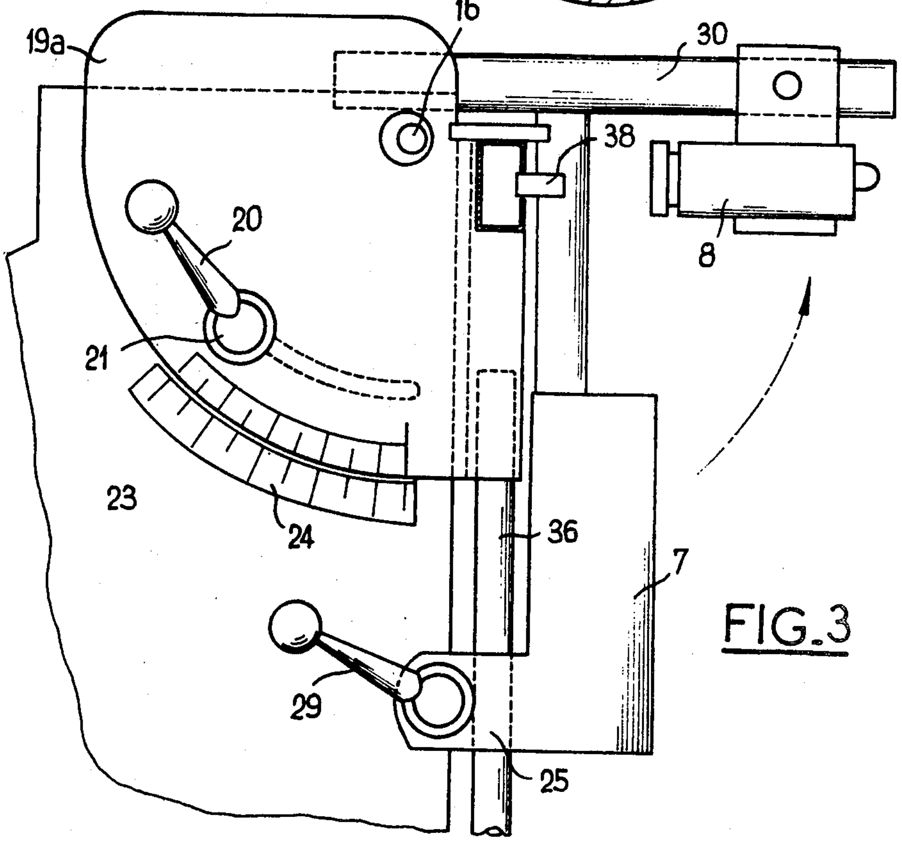
FIG. 3 is a side elevational view showing on a larger scale a detail of the machine.

The base structure 1 carries in the vicinity of its front surface a horizontal pin 16 supporting in turn at its ends projecting from said base structure a pair of arms 19*a*, 19*b* rigid with a table 6 so that the latter can pivot about said pin 16, and also abutment and clamping means such as a handle 20 controlling a key 21 extending through a circular aperture 22 formed in the lateral plate 23 of said base structure. Vernier means 24 are provided for checking the degree of inclination of said table 6 (FIG. 3).

This table 6 carries depending columns 36, 37 on which guide members 25, 26 rigid with a table 7 are adapted to slide so as to control the sliding movements and the vertical positioning of said table with the assistance of clamping members 29.

This table 7 carries on either side, on a pair of side arms 30, 31, a clamping jack 8 adapted to hold the piece of joinery to be drilled and/or screwed against an abutment member comprising a tubular longitudinal member 34 provided with positioning sliding blocks or stop members 38.

The machine is equipped with electric contact means 40, 41, and 42, 43 for controlling the operation of the cylinder-and-piston unit 5 and also the rotation of heads 3 and 4. The depth of the drilling and screwing operations is preset by means of a pair of contacts 42, 43 adapted to discontinue the operation of said unit 5.

The screwing head comprises a pair of jaws 60, 61 urged towards each other by spring means and between which the pegs are inserted manually. During the upward movement of the head the jaws separate from each other and the peg is retained in the piece of joinery or woodwork by being screwed therein.

In order to have this screwing head constantly stopped in the same position in relation to the piece of joinery, said head is provided with a lateral notch 44 bounded by a tooth-like edge 45 engageable by a small piston 48 responsive to a solenoid valve operated by the pair of contacts 42, 43 for stopping the motor.

The above-described machine operates as follows:

Firstly, the operator positions the piece of joinery or the like on the machine so that the face of the upright to be equipped with hinges is disposed alongside the abutment member 34 and against the blocks 38 preset in the desired position, the upright bearing on the table 7 and being clamped by the jacks 8. The proper orientation of the upright face is then obtained by pivoting the table 6 about the pivot pin 16, the proper or selected position being maintained by tightening the handle 20.

The operator then adjusts the height of the drilling spindle 4 by means of said actuator 5 responsive to contacts 40, 41 and starts the motor 9 for driving the drilling head and lowering the cylinder and piston unit simultaneously and gradually, the movement thereof being stopped automatically when the electric contacts 42 and 43 engage each other.

Then, the operator moves the actuator upwards and, by rotating the plate or tray 10, brings the screwing head 3 supporting a hinge plate to a position of mutual alignment with an underlying hole drilled by the drilling head, the aperture 12 and pin 13 warranting the accurate positioning of the spindle for this purpose.

Again, the motor 9 is started to lower the actuator 5, and stopped when said contacts 42 and 43 engage each other. The accurate orientation of the hinge plate supported between the jaws 60 and 61 is obtained by inserting the piston 46 into the notch 45.

When the spindle is moved upwards, the hinge plate escapes from the jaws 60 and 61 now opened as a consequence of their elastic mounting.

Under these conditions, the piece of joinery or woodwork can be pushed along member 34 until it reaches another position determined by another stop member.

It is clear that with this machine rapid and convenient operations can be performed since the machine is not only fixed but also occupies a minimum floor space or area.

Figure 9:
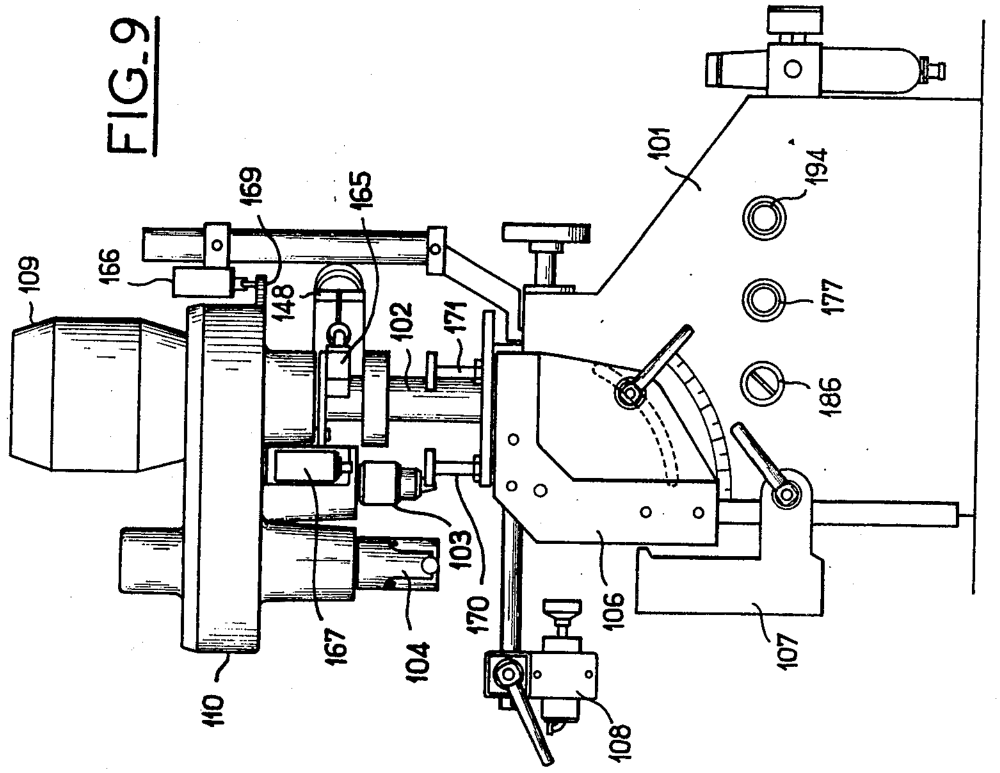
FIG. 9 is a side elevational view of the machine of FIG. 8 in its screwing position.
Figure 8:
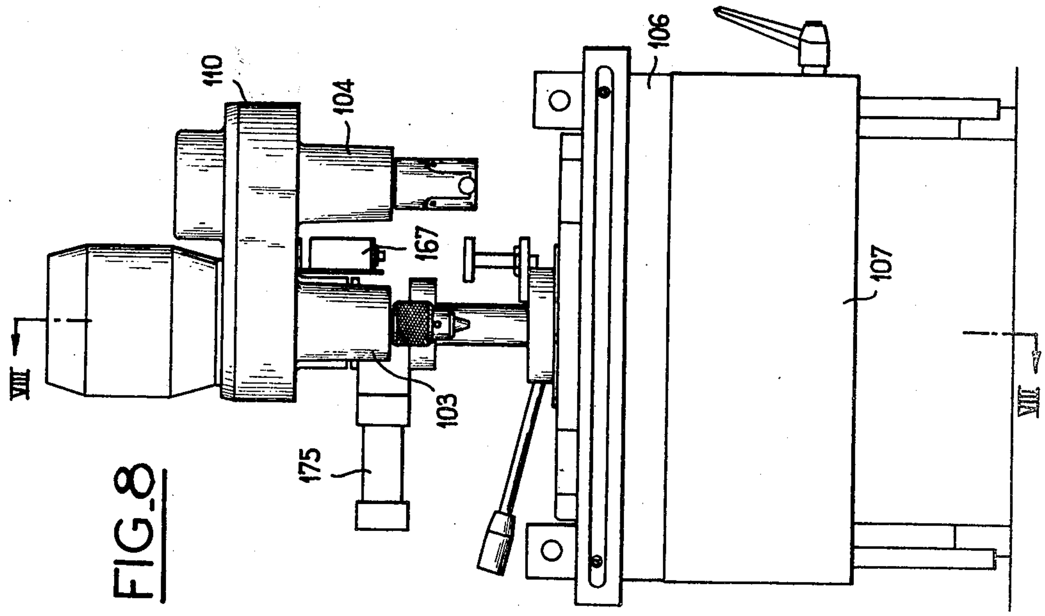
FIG. 8 is a front elevational view of an automatic machine in its drilling position.
Figure 12:
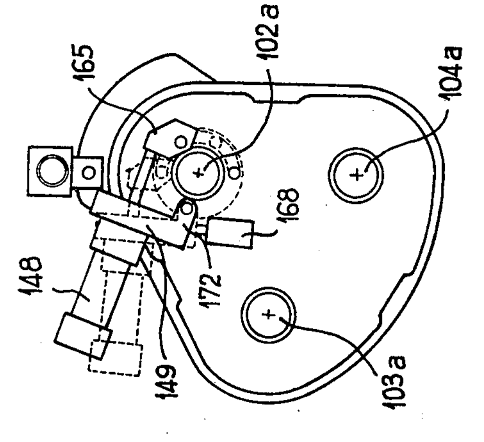
FIG. 12 is a detail view from beneath showing the mechanism for pivoting the table.
Figure 10:
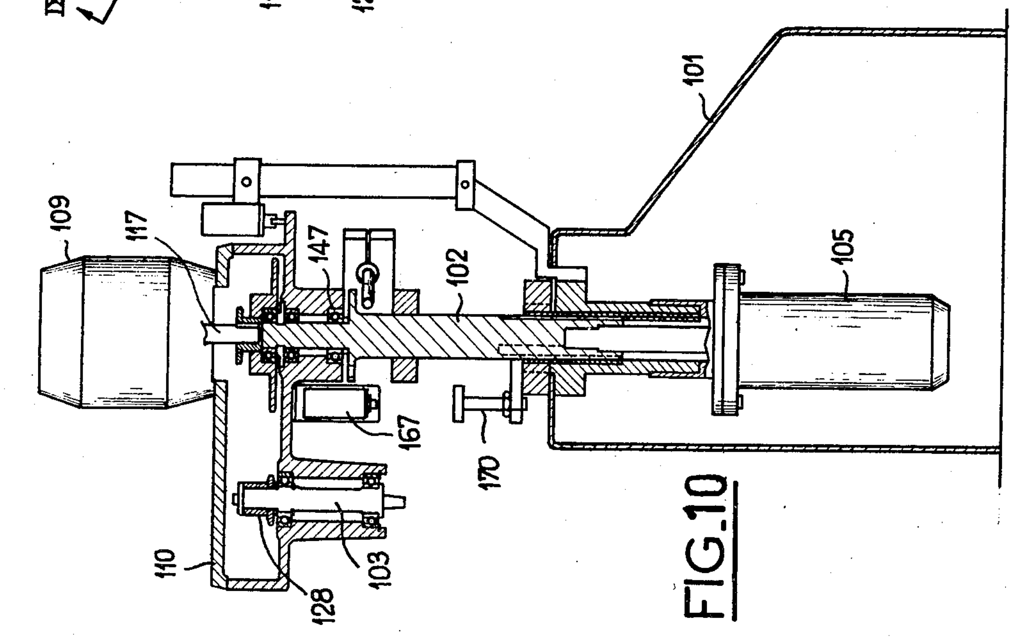
FIG. 10 is a cross section taken along the line VIII—VIII of FIG. 8.

According to a more improved form of embodiment illustrated in FIGS. 12 to 19 and referring firstly more in detail to FIGS. 8, 9 and 10 of the drawings, it will be seen that the machine comprises the same component elements as the preceding form of embodiment; the box-sectioned base 101 encloses a cylinder and piston unit 105 of which the piston rod 102 acts as a central column and carries the table 110 to which the depending drilling and screwing heads 103 and 104, respectively, are mounted. The base structure 101 also carries the pivoting table 106 and the bearing table 107 adapted to slide vertically, and the clamping cylinders or jacks 108.

Figure 11:
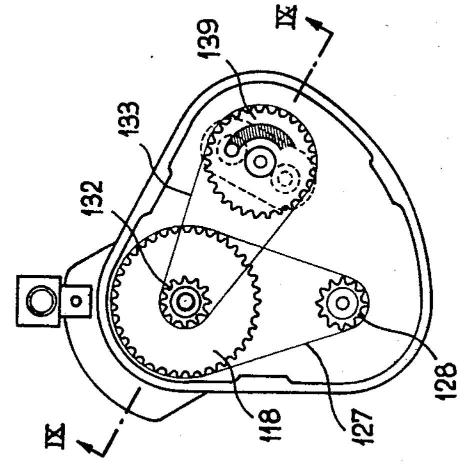
FIG. 11 is a detail view showing the interior of the table with the device for rotatably driving the heads.
Figure 13:
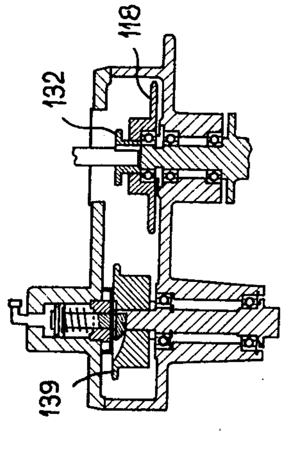
FIG. 13 is a cross section taken along the line IX—IX of FIG. 11.

The vertical rod or column 102 also carries by means of table 110 a motor 109 for rotatably driving the heads through means illustrated more in detail in FIGS. 10 and 11.

For this purpose, the motor 109 is supported on top of table 110 and the output shaft 117 coaxial to piston rod 102 (FIG. 10) projects into the hollow table 110 and carries therein a first toothed wheel 118 engaged by a chain 127 driving in turn a pinion 128 rigid with the shaft of the drilling head, and a second toothed wheel 132 engaged by another chain 133 for rotatably driving another pinion 139 rigid with the shaft of the screwing head.

The table 110 is pivotally mounted on top of piston rod or column 102 by means of suitable bearings 147 and carries, as already mentioned hereinabove, the drilling and screwing heads 103 and 104. The arrangement is such that axes 102*a*, 103*a* and 104*a* of said rod and said heads, respectively, are disposed at the vertices of a substantially equilateral triangle, whereby one head can be substituted for another by simply pivoting the table 110 through an angle of about 60°.

According to a specific feature of this invention, the table 110 is pivoted by means of a cylinder 148 carried through an arm 149 by the central piston rod 102 and disposed under the table 110 so as to actuate this table by means of a dog 165 pivoted to the end of the piston rod of cylinder 148 and rigid with said table 110.

The machine further comprises a number of electric contacts permitting the automatic operation of the machine through a sequence of predetermined steps. These contacts designated by the reference numerals 166, 167, 168 are adapted to co-act with stop members such as 169 carried by the table 110, 170 and 171 carried by the base structure 101, and 172 on the pivoted support of cylinder 148. An auxiliary cylinder 175 acting like the piston 46 of the preceding form of embodiment, is adapted to stop the hinge-plate in a precise orientation by locking the screwing head 104.

Figure 14:
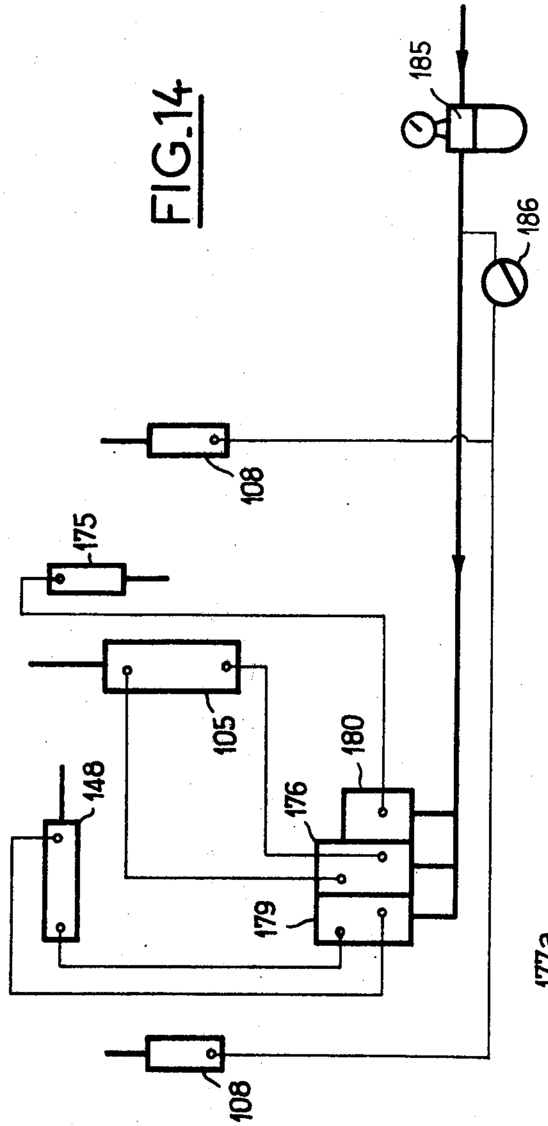
FIG. 14 is a diagram showing the pneumatic system.

The diagrams of FIGS. 14 and 15 will assist in clearly understanding the mode of operation of the machine described hereinabove, which is connected to suitable sources of compressed air and electric current.

In the inoperative condition, the table 110 is maintained in its uppermost position by cylinder 105 connected to the source of compressed air, via a solenoid-operated valve 176 and the drilling head is in the desired position for performing the operation contemplated.

Before starting the cycle of operations, the piece of joinery is clamped and locked at the desired and suitable level, by actuating the cylinder 108 responsive to push button 186, with contact 166 engaging the stop member 169, the twin contacts 166*a* being open and 166*b* closed. The operator depresses an "ON" push-button 177, thus closing contact 177*a* and, via relay 178, the auxiliary holding contact 178*a* and contact 178*b* supplying current to line 187, and relay 188 closing contact 188*a*; the motor 109 is started, thus rotatably driving the heads, and solenoid valve 176 vents the cylinder 105 to the atmosphere while the table 110 moves vertically downwards and the drilling head is caused to drill the hole contemplated.

When the stroke is sufficient to cause the front contact 167 to engage stop member 170, this contact closes and energizes via back contact 168 the coil of relay 189 closing in turn the holding contact 189*a* while opening contact 189*b*, reversing the solenoid valve 176 and, consequently, controlling the upward movement of table 110 by means of cylinder 105. When the table 110 has completed this upward stroke, stop member 169 engages contact 166, thus opening contact 166*a* and closing contact 166*b*. This energizes the relay 190 via contact 189*a*, so that holding contact 190*a* and contact 190*b* are closed and another solenoid valve 179 is energized to open the compressed-air cylinder 148. Table 110 is rotated until the screwing head is substituted for the drilling head at the working station. At the end of this rotational movement, stop member 172 engages and opens contact 168, thus deenergizing relay 189, and opening contact 189*a* and closing contact 189*b* thereof; therefore, the table 110 is again lowered and the cylinder 105 is vented to the atmosphere via solenoid valve 176.

The hinge plate carried by the screwing head is then secured to the piece of joinery where it has to be stopped in the desired orientation by cylinder 175. For this purpose, when contact 167 at the end of the stroke engages stop member 171, this contact 167 is closed and, via contact 190*c* of relay 190, remains energized through its holding contact 190*a* to energize relay 190, thus tilting contact 192*a*, closing contact 192*b* and opening contact 192*c*. Contact 192*b* energizes the solenoid valve 180 of cylinder 175 so as to stop the plate in the desired orientation. At the same time, the tilting of contact 192*a* deenergizes relay 188 with a time lag obtained by means of a capacitor 193, thus opening contact 188*a*. The head driving motor 109 is stopped and solenoid valve 176 controls the upward stroke of table 110 via cylinder 105. Contact 192*c* being opened at the same time as contact 166*a*, relay 178 is deenergized, thus opening contacts 178*a* and 178*b*, and since solenoid valve 179 is now deenergized, cylinder 148 is inverted and the table is caused to resume its initial position in which it is ready for another working cycle.

A push-button 194 is provided for stopping the machine in case of emergency.

According to a further improvement characterizing the present invention, the screwing head may be fed automatically with hinge plates at the end of each cycle.

For this purpose, a magazine 196 is disposed in the vicinity of the screwing head, in the initial position thereof, and supplies a chamber 197 from which the plates are pushed separately and successively into the head cavity by means of a push member 198 responsive to a cylinder 199. This assembly is supported by an arm 200. A fixed stop member 201 co-acts with a contact rigid with the cylinder control plate 202.

Figure 15:
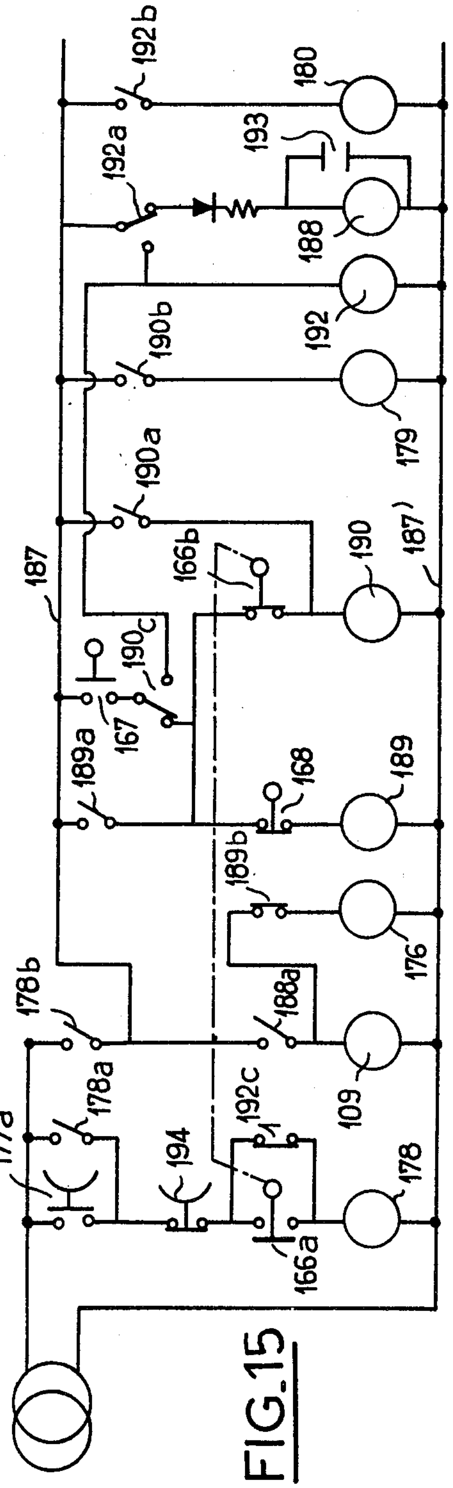
FIG. 15 is a wiring diagram of the electrical circuitry of the machine.
Figure 16:
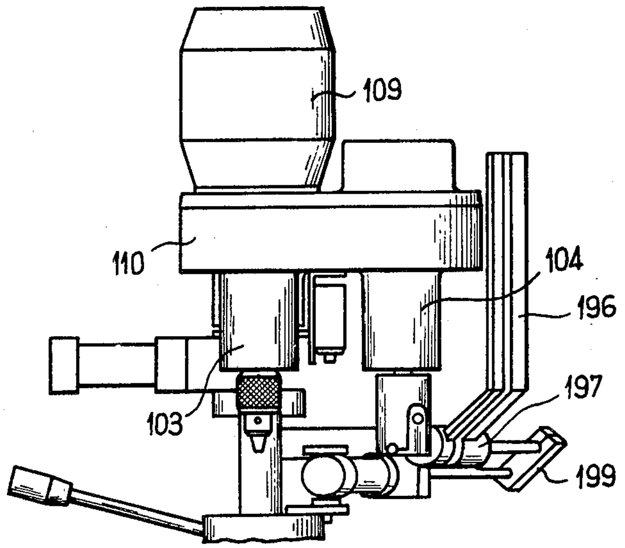
FIG. 16 is a fragmentary front elevational view of a machine equipped with automatic hinge-plate feeding means.

This magazine operates by means of a complementary device associated with the electric device illustrated in the diagram of FIG. 15, at the end of feed lines 187 and 187'.

When the screwing head has resumed its initial position, after completing a cycle, contact 202 energizes a solenoid valve controlling the cylinder 199 which introduces another plate into the screwing head 103.

Figure 17:
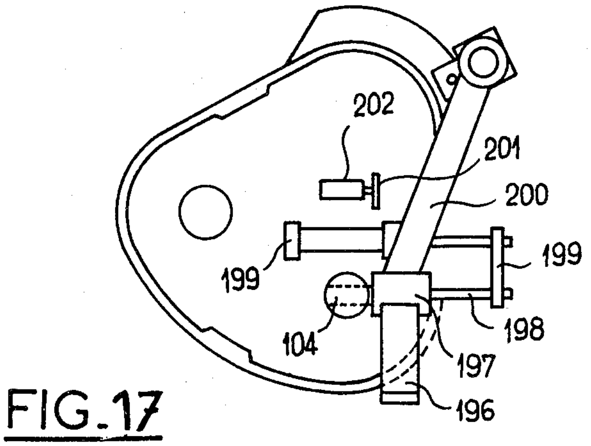
FIG. 17 is a detail view of the table and feed device of FIG. 16.

In FIG. 17 a system comprising a pair of solenoid valves 180, 180' is also shown; with this arrangement, according to the position of inverter 195, the hinge plate is stopped in a "right-hand" or "left-hand" position spaced 180° from the other, by means of cylinder 175 or 175'.

Although a specific form of embodiment of this invention has been described hereinabove and illustrated in the attached drawings, it will readily occur to those skilled in the art that various modifications and changes may be brought thereto without departing from the scope of the invention as set forth in the appended claims.

What is claimed is:

1. Drilling and screwing machine intended more particularly for fitting door-hinge plates or like hardwares on pieces of joinery or similar elements, this machine comprising in the known fashion: a pivoting assembly consisting of a table supporting on one side a drilling head and on the other side a screwing head, an electric motor for rotatably driving said heads, a cylinder and piston unit of which the piston-rod supports said table, and means for retaining in position the piece of joinery which are secured to the front face of the machine base structure, said means consisting of a system comprising two tables adjustable, one about an horizontal axis and the other vertically, said machine being characterized in that it comprises on the other hand a box-shaped base structure (1) in which the main cylinder and piston unit (5) is enclosed with its piston-rod (2) extending vertically through an aperture (50) formed in the top (53) of said box-shaped base structure, means being also provided for moving and guiding the cylinder, piston-rod and table assembly through said aperture and locking said assembly in a preselected position, the tables associated with said base structure being so disposed that the first table (6) rotatably mounted on said base structure supports the second table (7) adapted to slide in relation thereto, said second table carrying the cylinder and piston units (8) provided for clamping the piece of joinery in position and holding it at the desired height and in the desired orientation.

2. Machine comprising a base structure according to claim 1, characterized in that the means for supporting and guiding the piston rod consist of a sleeve (57) having said cylinder (5) secured to its lower portion, one portion of said sleeve constituting a guide plate (51) of which the edges are adapted to slide along the aforesaid aperture, said sleeve bearing through a flange (52) on the top of said base structure and being adapted to be held against movement through any known and suitable means in a predetermined position, the piston-rod (2) extending in sliding contact through the axial bore if said sleeve (57) but without any pivotal freedom.

3. Machine comprising a base structure according to claim 1, characterized in that the rotatable table comprises two lateral arms (19*a*, 19*b*) which are trunnioned about a horizontal axis (16) and extend at right angles to the aperture (50) in which the piston-rod of the cylinder (5) is adapted to move, said arms supporting therebetween a hollow section (34) provided with stop members (38), and an apron to which the columns (36, 37) receiving guide members (25, 26) rigid with a sliding table (7) are secured.

4. Machine according to claim 1, characterized in that the sliding table (7) comprises cylinder and piston actuators (8) for clamping the piece of joinery in a suitable position against the hollow section of the rotary table (6) and above the sliding table (7).

5. Machine according to claim 1, characterized in that the cylinder piston-rod constituting a supporting column carries a flange (11) supporting the table carrying the drilling and screwing heads, and has formed therein an aperture (12) engaged by a stud (13) rigid with the lower portion of the table for limiting and adjusting the rotational movement of the table.

6. Drilling and screwing machine according to claim 1, characterized in that a cylinder and piston unit (148) is provided which is attached on the one hand to the supporting column (102) formed by said piston-rod which supports said table, and on the other hand to the table carrying the drilling and screwing heads (103–104) in order to bring said heads alternatively to their working position.

7. Machine according to claim 6, characterized in that electric control contacts (166–167–168) are adapted to be actuated by suitable stop members (169–170–171–172) at the ends of the working stroke of the drilling and screwing heads and at the ends of the positioning movements of the table for obtaining a cycle including the downward movement of the drilling head, until a predetermined vertical position is obtained, the upward movement of said drilling head, the rotation of the table and the positioning of the screwing head, the downward stroke of the screwing head, the stoppage of said screwing head in a predetermined position and orientation, the upward movement of the screwing head, and the return of said table to the initial position preliminary to another cycle of operations.

8. Machine according to claim 6, characterized in that it comprises a cylinder and piston unit (175) for locking the screwing head in the position corresponding to the end of its working phase.

9. Machine according to claim 7, characterized in that solenoid-operated valves (176–179–180) responsive to said contacts are associated with each cylinder and piston unit for controlling the up- and down strokes of the table, the pivoting movements of the table and the locking of the screwing head.

10. Machine according to claim 9, wherein a pair of cylinder and piston units (175–175') are provided for stopping the hinge plates in two opposed, right-hand or left-hand, orientations.

* * * * *